United States Patent
Kern et al.

(10) Patent No.: US 7,467,168 B2
(45) Date of Patent: Dec. 16, 2008

(54) METHOD FOR MIRRORING DATA AT STORAGE LOCATIONS

(75) Inventors: Robert Frederic Kern, Tucson, AZ (US); William Frank Micka, Tucson, AZ (US); Gail Andrea Spear, Tucson, AZ (US); David B. Petersen, Great Falls, VA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/465,111

(22) Filed: Jun. 18, 2003

(65) Prior Publication Data

US 2004/0260736 A1    Dec. 23, 2004

(51) Int. Cl.
G06F 12/00 (2006.01)
G06F 17/30 (2006.01)

(52) U.S. Cl. .................. 707/204; 707/202; 707/203
(58) Field of Classification Search ........... 707/204, 707/202, 201; 714/38, 11, 6
See application file for complete search history.

(56) References Cited

U.S. PATENT DOCUMENTS

| | | | |
|---|---|---|---|
| 5,504,861 A | | 4/1996 | Crockett et al. |
| 5,615,329 A | | 3/1997 | Kern et al. |
| 5,692,155 A | | 11/1997 | Iskiyan et al. |
| 5,715,386 A | * | 2/1998 | Fulton et al. ............. 714/38 |
| 5,734,818 A | | 3/1998 | Kern et al. |
| 5,999,712 A | * | 12/1999 | Moiin et al. .............. 709/220 |
| 6,035,412 A | * | 3/2000 | Tamer et al. .............. 714/6 |
| 6,145,094 A | * | 11/2000 | Shirriff et al. ............. 714/11 |
| 6,185,695 B1 | * | 2/2001 | Murphy et al. ............ 714/4 |
| 6,199,074 B1 | | 3/2001 | Kern et al. |
| 6,671,705 B1 | * | 12/2003 | Duprey et al. ............ 707/204 |
| 6,823,349 B1 | * | 11/2004 | Taylor et al. ............. 707/204 |

(Continued)

OTHER PUBLICATIONS

U.S. Appl. No. 10/134,414, entitled "System and Method for Automatic Dynamic Address Switching", filed Apr. 29, 2003 by inventors M.J. Shannon, H. Yudenfriend, and D.B. Peterson.

(Continued)

*Primary Examiner*—Jean M. Corrielus
*Assistant Examiner*—Giovanna Colan
(74) *Attorney, Agent, or Firm*—David W. Victor; Konrad Raynes & Victor LLP

(57) ABSTRACT

Provided is a method for mirroring data. A mirror policy indicating volumes in a first storage system is processed to mirror to volumes in a second storage system and volumes in the second storage system to mirror to volumes in a third storage system. The third storage system is at a first geographical location remote with respect to a second geographical location including the first and second storage systems. A command is transmitted to cause the copying of updates to the volumes in the first storage system to corresponding volumes in the second storage system indicated in the mirror policy. Upon an occurrence of an event, the causing the suspension of the copying of updates to the volumes in the first storage system indicated in the mirroring policy to the volumes in the second storage system. During the suspension of the copying of volumes between the first and second storage systems, causing the copying of updates to the volumes in the second storage system indicated in the mirroring policy to the volumes in the third storage system indicated in the mirroring policy.

9 Claims, 9 Drawing Sheets

U.S. PATENT DOCUMENTS

2003/0014433 A1* 1/2003 Teloh et al. ............. 707/204
2003/0182325 A1* 9/2003 Manley et al. ........... 707/204
2003/0208511 A1* 11/2003 Earl et al. ................ 707/204
2004/0093361 A1* 5/2004 Therrien et al. .......... 707/204

OTHER PUBLICATIONS

U.S. Appl. No. 10/134,254, entitled "System and Method for Concurrent Logical Device Swapping", filed Apr. 29, 2003 by inventors J. Staubi, H. Yudenfriend, and D.B. Peterson.

G. Castets, et al., "IBM TotalStorage Enterprise Storage Server PPRC Extended Distance", IBM Corp. International Technical Support Organization, Document No. SG24-6568-00, Jun. 2002.

N. Dhondy, et al., "Geographically Dispersed Parallel Sysplex:: The Ultimate e-business Availability Solution", IBM Corp., Oct. 2002, pp. 1-22.

IBM Corp., "ESS PPRC Extended Distance Support for z/VM and VSE/ESA Users", [online], Feb. 2003, p. 1, [Retrieved on Jun. 2, 2003]. Retrieved from the Internet at URL: <http://www-1.ibm.com/support/docview.wss?uid=tss1flash10163.

U.S. Securities and Exchange Commission., "Interagency Paper on sound Practices to Strengthen the Resilience of the U.S. Financial System", [online], Apr. 2003, p. 1, [Retrieved on Jun. 3, 2003]. Retrieved from the Internet at URL: <http://www.sec.gov/news/studies/34-47638.htm.

IBM Corp, "Business Continuity Considerations and the IBM eservier zSeries", Document No. GM13-0256-00 May 2003, pp. 1-8.

* cited by examiner

Configuration Database Entry

METHOD FOR MIRRORING DATA AT STORAGE LOCATIONS

BACKGROUND OF THE INVENTION

1. Field of the Invention

The present invention relates to a system, method, and program for mirroring data at storage locations.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM of XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volumes in the volume pair in the same order as they were done on the primary volume. In the XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage device. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

One technique to maintain consistency across copies is to timestamp data across primary volumes using a common clock source, referred to as a SYSPLEX timer. Updates will be transferred in groups defined as all updates having a timestamp less than a certain time. In additional implementations, the time of the latest update on the primary and secondary storage controller can be determined and the time to use as the cut-off for the consistency group would be the minimum of the update having the highest timestamp on the primary and secondary controllers.

Another technique for forming consistency groups is to determine a cut-off time. Any updates to primary volumes managed by the primary controller cache dated as of the that cut-off time are transferred to the secondary controller for storage in the secondary volumes. While transferring the data in the consistency group, the primary storage controller would return busy to any host requests while the data in the consistency group is transferred. After the data in the consistency group is transferred and the primary and secondary storage controller are synchronized, i.e., any updates whose timestamp is less than the cut-off time, then the primary controller would cease returning busy to the applications. This ensures that the primary and secondary volumes are consistent as of the freeze cut-off time.

SUMMARY OF THE PREFERRED EMBODIMENTS

Provided are a method, system, and program for mirroring data. A mirror policy indicating volumes in a first storage system is processed to mirror to volumes in a second storage system and volumes in the second storage system to mirror to volumes in a third storage system. The third storage system is at a first geographical location remote with respect to a second geographical location including the first and second storage systems. A command is transmitted to cause the copying of updates to the volumes in the first storage system to corresponding volumes in the second storage system indicated in the mirror policy. Upon an occurrence of an event, the causing the suspension of the copying of updates to the volumes in the first storage system indicated in the mirroring policy to the volumes in the second storage system. During the suspension of the copying of volumes between the first and second storage systems, causing the copying of updates to the volumes in the second storage system indicated in the mirroring policy to the volumes in the third storage system indicated in the mirroring policy.

In further implementations, a determination is made as to whether the copying of the updates to the volumes in the second storage system to volumes in the third storage system has completed. If the copying has completed, then causing the end of the suspension to cause the continuation of the copying of updates to the volumes in the first storage system to the volumes in the second storage system.

In still further implementations, the mirroring policy indicates volumes in the third storage system to mirror to volumes in a fourth storage system at the second geographical location. A determination is made as to whether the copying of the updates to the volumes in the second storage system to volumes in the third storage system has completed. A copy is made of the volumes in the third storage system indicated in the mirroring policy to the volumes in the fourth storage system indicated in the mirroring policy.

Still further, updates continue to be received and made to the volumes in the first storage system during the suspension of the copying of volumes between the first and second storage systems.

Described implementations provide techniques to mirror data between distant sites to allow recovery of data in case of the failure at an entire site.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
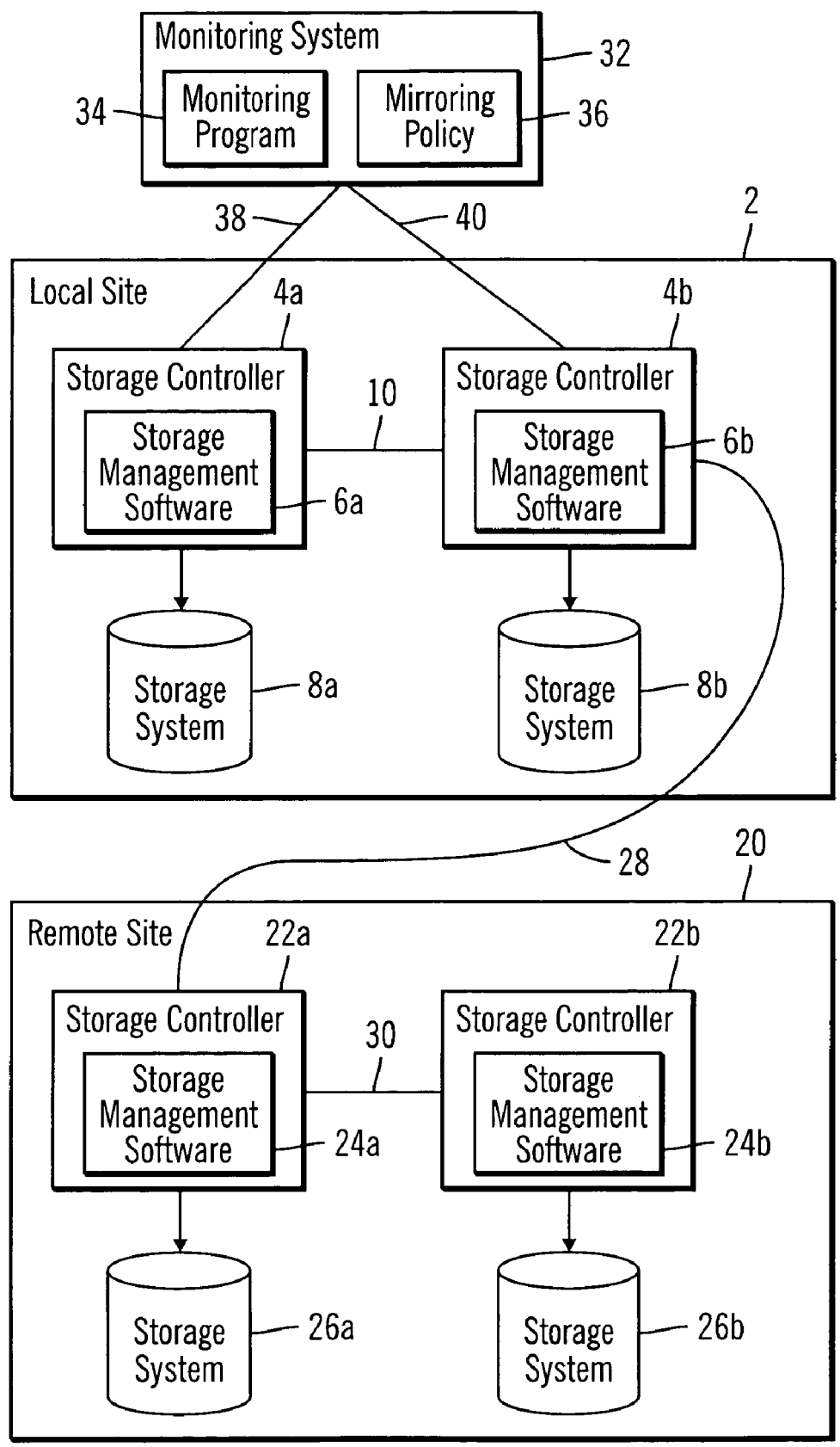
FIG. 1 is a block diagram illustrating a network computing environment in which aspects of the invention are implemented.

FIG. 1 illustrates a network computing environment in which aspects of the invention may be implemented. A local site 2 includes two storage controllers 4a, 4b each having storage management software 6a, 6b and attached storage systems 8a, 8b. The storage controllers 4a, 4b may be situated in a relatively close geographical area, such as a same building, different buildings in a same campus, a same city, etc. The connection 10 between the storage controllers 4a, 4b may comprise a dedicated line or network, such as a Storage Area Network (SAN), Local Area Network (LAN), etc. Alternatively, the connection 10 may comprise an Intranet or the Internet. A remote site 20, which may be hundreds or thousands of miles from the local site includes two storage controllers 22a, 22b having storage management software 24a, 24b and attached storage systems 26a, 26b. Connection 28 provides a long distance connection between storage controllers 4a and 22a, where connection 28 may comprise a dedicated fibre optical network managed or connection maintained by a long distance telecommunication carrier, the Internet, etc. The long distance connection 28 may be intercontinental. Connection 30 between the storage controllers 22a, 22b provides a relatively short connection (e.g., within dozens of miles), where the storage controllers 22a, 22b may be in a relatively close geographical area, such as a same building, different buildings in a same campus, a same city, etc.

Host systems (not shown) at the local 2 and remote 20 sites may perform Input/Output (I/O) operations with respect to volumes in the storage systems 8a, 8b, 26a, 26b via storage controllers 4a, 4b, 22a, 22b. The host systems may communicate with storage controllers 4a, 4b, 22a, 22b via any network or connection known in the art.

The storage controllers 4a, 4b, 22a, 22b would further include a processor complex (not shown) and may comprise any storage controller or server known in the art, such as the IBM Enterprise Storage Server (ESS)®, 3990® Storage Controller, etc. (Enterprise Storage Server is a registered trademark of IBM). The storage systems 8a, 8b, 26a, 26b may comprise an array of storage devices, such as Just a Bunch of Disks (JBOD), Redundant Array of Independent Disks (RAID) array, virtualization device, etc. The storage management software 6a, 6b, 24a, 24b may include code to allow for mirroring of data and data recovery in the event of a failure, such as the code included in the IBM PPRC Extended Distance program, to allow for mirroring of data over relatively short and long distances. Further details of the IBM PPRC extended distance program are described in the IBM publication "IBM TotalStorage Enterprise Storage Server PPRC Extended Distance", having document no. SG24-6568-00 (Copyright IBM, June 2002), which publication is incorporated herein by reference in its entirety.

FIG. 1 further shows a monitoring system 32 having a monitoring program 34 that provides control over the mirror copy operations between the different storage controllers 4a, 4b, 22a, 22b. The monitoring and copy operations initiated by the monitoring program 34 may run automatically after an initial setup by a system administrator, or may run in response to manual commands and monitoring performed by the system administrator. A monitoring policy 36 includes information on how the mirror copy relationships between the different storage controllers 4a, 4b, 22a, 22b are managed. In effect, the monitoring policy 36 may comprise code executed by the monitoring program 34 to implement the copy operations through sending commands to storage controller 4a. The monitoring policy 36 may also specify an initial copy setup, such as indicating the volumes in the storage system 8a and volumes in storage system 8b, 26a, 26b that store the mirrored volumes. For instance, the monitoring policy 36 may indicate a copy relationship, such as a PPRC relationship of volume pairs in the storage systems 8a, 8b, where specified volumes in storage system 8b provide a secondary copy of specified volumes in storage system 8a, and a copy relationship of volume pairs between storage system 8b and 26a as well as a copy relationship between 26a and 26b.

The monitoring system 32 has connections 38 and 40 to the storage controllers 6a and 6b, respectively, where such connection may be implemented using any network technology known in the art, such as a Small Computer System Interface (SCSI) channel, Fibre Channel, Enterprise System Connection (ESCON)®, Ethernet, etc. In alternative implementations, the monitoring system 32 may only be connected to storage controller 4a. The monitoring program 34 is capable of issuing commands to storage controllers 22a, 22b through storage controller 6a and/or 6b. The connections 10, 30, 38, and 40 may be part of a same network or different networks.

Figure 2:
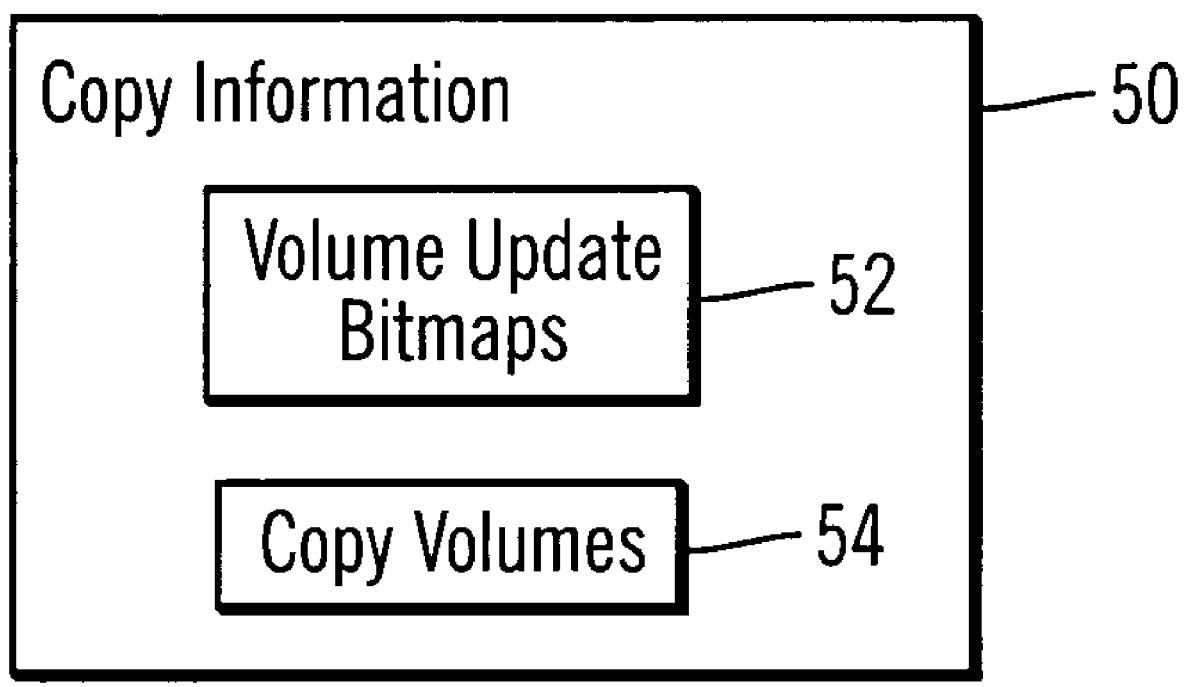
FIG. 2 illustrates copy information maintained at storage controllers to mirror data to different locations.

FIG. 2 illustrates copy information 50 each of the storage controllers 4a, 4b, 22a, 22b maintain in memory to manage copy operations to mirror updates to a secondary controller. The copy information 50 includes volume update bitmaps 52, where each volume bitmap includes a bit for each track in the volume. When the storage controller 4a, 4b, 22a, 22b receives an update to a track, the corresponding bit in the volume bitmap 52 is turned "on" to indicate an update. Copy volume 54 information identifies the volume pairs involved in the copy relationship between two storage controllers. Certain of the storage controllers, such as storage controller 4b may maintain copy information for multiple copy relationships, such as the copy relationship with local storage controller 4a and the copy relationship with remote storage controller 22a.

Figure 3:
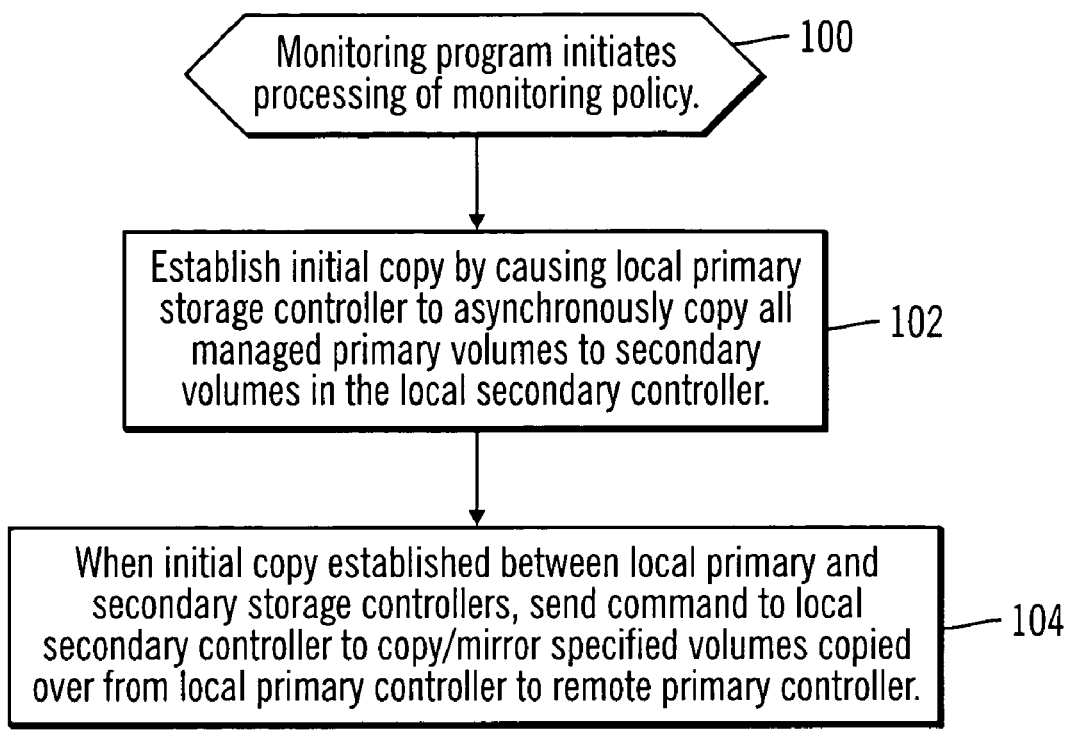
FIGS. 3, 4, and 5 illustrate operations performed to mirror data to different storage locations in accordance with implementations of the invention.
Figure 4:
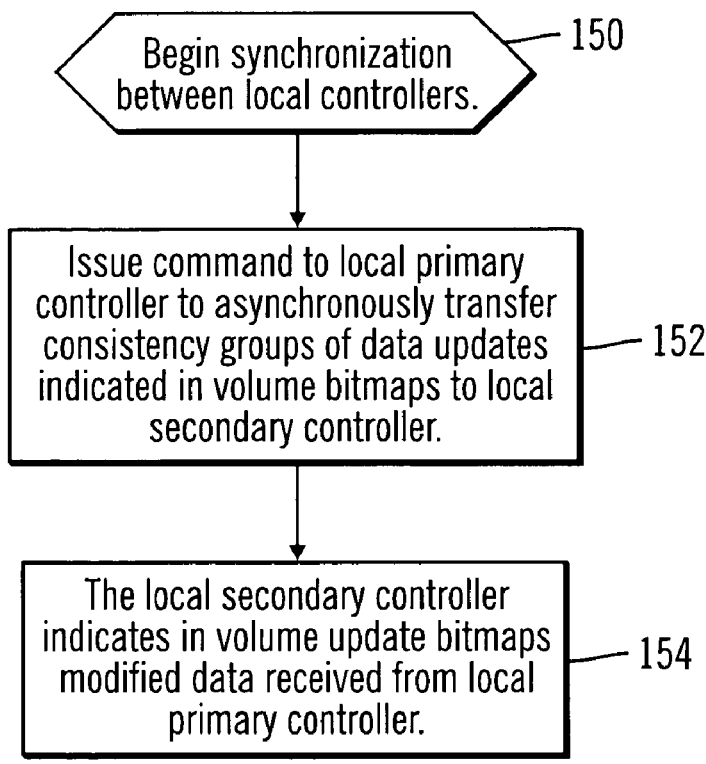
Figure 5:
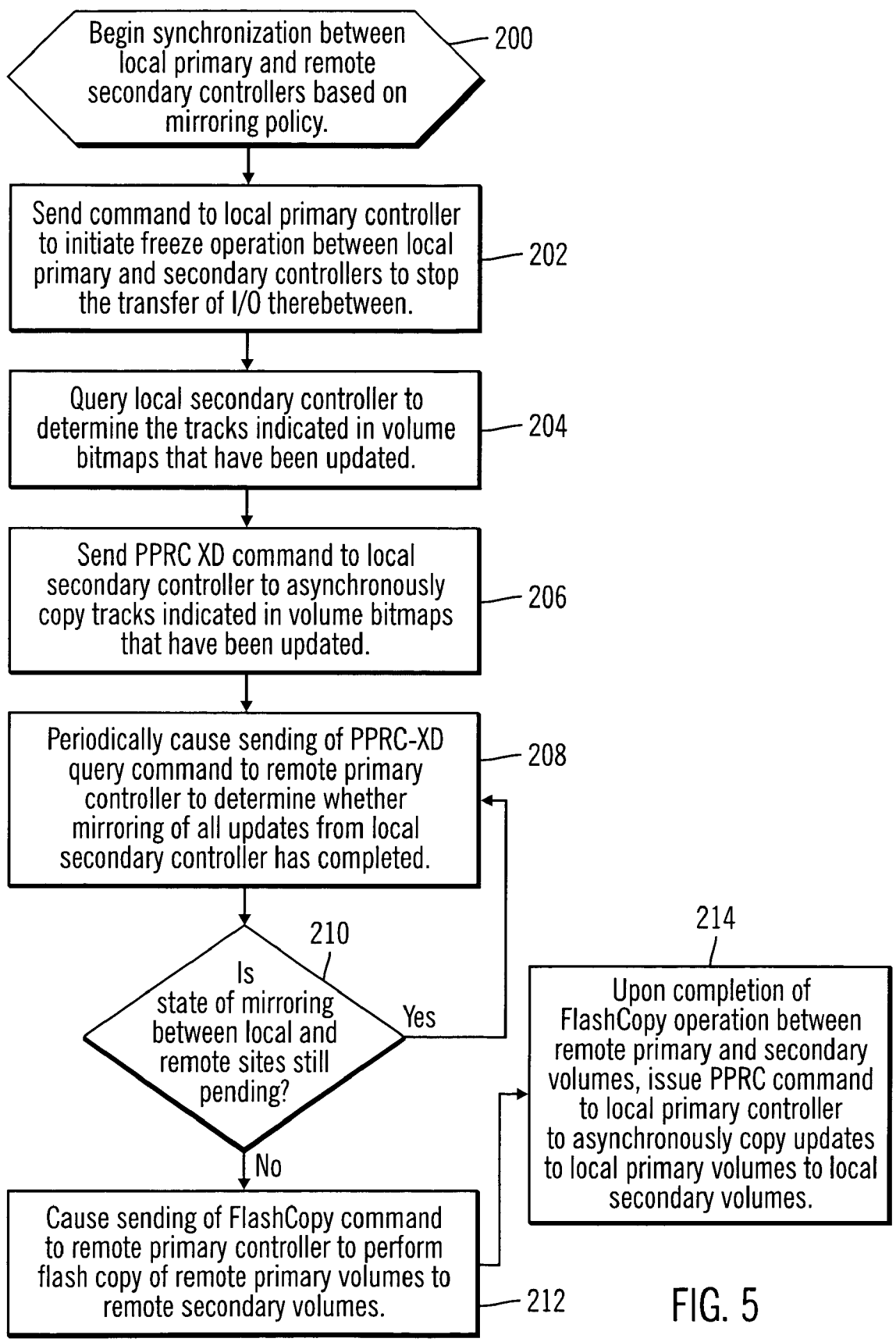

FIGS. 3, 4, and 5 illustrates operations performed by the monitoring program 34 in response to processing information in the mirroring policy 36 to cause mirroring operations between the storage controllers 4a, 4b, 22a, 22b. With respect to FIG. 3, the monitoring program 34 initiates the mirroring based on the mirroring policy 36, which indicates volume pairs between the local storage systems 8a, 8b for mirroring, the local storage system 8b and remote storage system 26a, and between the remote storage systems 26a, 26b. The mirroring policy 36 may also indicate the type of copy operation to mirror between the different storage systems, such as for the volumes in storage systems 8a, 8b, asynchronous copy operations are used; for the volumes in local storage 8b and remote storage 26a, extended distance copy operations are used, e.g., PPRC XD; and for remote storage 26a, 26b, Flash-Copy™ is used. (FlashCopy is a trademark of International Business Machines, Corp.).

A FlashCopy® involves establishing a logical point-in-time relationship between source and target volumes. A bitmap, such as volume update bitmaps 52 (FIG. 2), is maintained for each volume having a bit value for each track indicating whether the data for a track is located in the volume or another volume. The copy is established when the bitmap indicating all source data subject to the flash copy are created. A background copy operation will copy all tracks whose bitmap value is "on" from the source to target volumes. During the establishment operation, all the bit values in the bitmap for the target volume are set to "on" to indicate that the data for the target volume is at another location. After the relationship is established, if an attempt is made to stage data to a track, the bit value in the bitmap for the volume including the track is checked. If the bit value is "on", indicating the track is a target track subject to a point-in-time copy relationship, then the target track is staged from the corresponding source track in the source device into the target cache. If an access attempts to destage a source track from source cache, the bitmap for the corresponding target volume having the target track is checked. If the bit value in the target bitmap is "one", then the target track is staged from the source device to the target cache, then destaged from the target cache to the target device and the bit value in the target bitmap for the destaged track from target cache is set to "off". The access to the source track is only granted after the target relationship bitmap indicates that there is no longer any need to stage the source track to the target cache.

With respect to FIG. 3, the monitoring program 34 would perform (at block 102) an initial copy of all primary volumes for storage controller 8a indicated in the mirroring policy 36 to the corresponding volumes in the secondary storage system 8b. When the initial copy is completed between the local primary 4a and secondary 4b storage controllers, the monitoring program 34 would then send (at block 104) a command to the local secondary controller 4b to asynchronously copy/mirror specified volumes, which were copied over from local primary controller 4a, to the remote primary storage controller 22a. If there is a direct connection 40 between the monitoring system 32 and storage controller 4b, then the command sent at block 104 may be sent directly to the storage controller 4b, or have the command sent through storage controller 4a and connection 10. Further, a FlashCopy operation may be performed to copy the initial copy in the volumes in storage system 26a to the specified volumes in storage system 26b.

With respect to FIG. 4, after establishing the initial copy of the data, the monitoring program 34 begins (at block 150) the process to have the primary storage controller 4a asynchronously copy updates to the local secondary storage controller 4b, where the updates may be sent asynchronously to avoid any delays to the host application or synchronously. At block 152, the monitoring program 34 sends an asynchronous copy command to the primary storage controller 4a to cause the storage controller 4a send any data updates indicated in the volume update bitmap 52 (FIG. 2) to the secondary storage controller 4b. In response, the secondary storage controller 4b receiving the update would indicate (at block 154) in the volume update bitmaps 52 the modified data received from local primary storage controller 4a. The primary storage controller 4a may form consistency groups of data to send data in consistency groups to the secondary storage controller 4b, so that the data stored in the secondary storage controller 4b is consistent as of the consistency time for the consistency group.

At some point, the monitoring program 34, according to parameters specified in the mirroring policy 32, would execute the logic of FIG. 5 to suspend the copying between the storage controllers 4a, 4b to allow for remote mirroring of data between the local storage controller 4b and the remote storage controller 22a. The suspension of copying between the storage controllers 4a, 4b permits remote mirroring between storage controllers 4b and 22a, such that all cross volume/cross storage subsystem data is time consistent across all volumes managed by the storage controllers 4b and 22a. After consistency is provided between controllers 4b and 22a, consistency is then provided to storage controller 22b before allowing the synchronous copying between local storage controllers 4a, 4b. During the suspension, a consistency point is still maintained from which recovery can occur in the event of a disaster occurring during suspension. For instance, if the local primary storage controller 4a fails, then consistency is maintained between the local secondary storage controller 4a and the remote primary storage controller 22a and consistency is maintained as a result of the FlashCopy to remote storage controller 22b. If the local storage controllers 4a, 4b are lost, then data as of the consistency point can be recovered from the remote storage controller 22b. Further, if there is a failure at the local site, then data can be recovered from the remote primary storage controller 22a before the data is copied to the remote secondary storage controller 22b, and from the remote secondary storage controller 22b after the copy (e.g., FlashCopy).

In certain implementations, the mirroring between storage controllers 4a, 4b, and 22a is continuous, except during the time of the suspension to form a consistency group to provide to the remote storage controller 4a. The process of FIG. 5 may be performed continuously, such as once a consistency group of data is copied from the primary storage controller 4a to the secondary storage controller 4b. Alternatively, the mirroring policy 36 may specify to perform the remote mirroring of FIG. 4 at a specific time during the day, at intervals of time, e.g., every 5 hours, upon the occurrence of an event, etc.

Upon initializing the remote mirroring (at block 200), the monitoring program 34, sends (at block 202) a command to the local primary controller 4b to initiate a freeze operation to freeze mirroring operations between the local primary 4a and secondary 4b storage controllers. The monitoring program 34 then queries (at block 204) the volume bitmaps 52 of the local secondary controller to determine the tracks that have been updated at the storage system 8b. A mirroring command, such as a PPRC command is then sent (at block 206) to the local secondary controller, either directly via connection 40 or through the primary storage controller 4a, to asynchronously copy tracks indicated in the volume bitmaps for the local secondary storage controller 4b that have been updated. The monitoring program 34 will then periodically cause the local secondary storage controller 4b to send (at block 208) an extended query command, such as a PPRC-XD query command (e.g., the CQUERY command), to the remote primary controller 22a to determine whether mirroring of all updates from local secondary controller 4b has completed. If (at block 210) the remote mirroring has completed, as indicated in the output information from the query command, then the monitoring program 34 causes a FlashCopy command to be sent to the remote primary storage controller 22a to copy (at block 212) the volumes of the storage system 26a indicated in the mirroring policy 36 to the remote secondary storage controller 22b. If the copy operation between the remote controllers 22a, 22b is a FlashCopy, then the pointers to the primary volumes would initially be copied to establish the copy, and the data would then be copied over in the background. If (at block 210) the remote mirroring has not completed, then control proceeds back to block 208 to continue the querying until the remote mirroring has completed. Thus, after mirroring updates from the local storage controller 4b to the remote storage controller 22a, the entire mirrored copy of data is copied to the remote secondary storage controller 22b to further harden the consistent data at the remote site 20.

Upon completion (at block 214) of the FlashCopy operation between the remote primary 26a and secondary 26b volumes, the monitoring program 34 would issue a command to end the suspension of mirroring between the primary 22a and secondary 22b storage controllers and to continue the asynchronous copying of updates between the primary 4a and secondary 4b storage controllers.

With the described implementations, the consistency group is hardened in the remote site 20. In the event that the storage systems in the entire local site 2 are wiped out, data can be recovered from the remote site 20, and all data would be consistent as of a single point-in-time maintained across all storage systems 8a, 8b, 8c, 8d, ensuring full cross volume/cross storage subsystem data integrity and data consistency. Such remote mirroring is particularly useful in this era of human and natural history where catastrophic events can result in the mass destruction of an entire geographical region and all data storage maintained in such region. In fact the, United States Government has recently suggested that important and crucial data, such as data essential to the maintenance of the financial infrastructure, be mirrored at remote locations to ensure the integrity and survival of such essential data in the event that data storage within an entire region is destroyed. The U.S. government goals concerning the use of remote data storage to ensure data integrity of the nation's financial infrastructure is described in the publication entitled "Interagency Paper on Sound Practices to Strengthen the Resilience of the U.S. Financial System", published by the Federal Reserve System Docket No. R-1123 and available on the Internet at "http://www.sec.gov/news/studies/34-47638.htm" (last updated April, 2003), which publication is incorporated herein by reference in its entirety.

Providing Continuous Operations and Disaster Recovery

One goal for enterprise and business computing is to maximize availability so that user applications have continuous access to data. This is especially important for mission critical computational transactions, including those essential to the nation's well being, such as financial transactions. Another goal is to maintain a backup policy that ensures that data is consistent and backed up frequently and provide a disaster failover recovery policy that minimizes disruptions to data availability.

Figure 6:
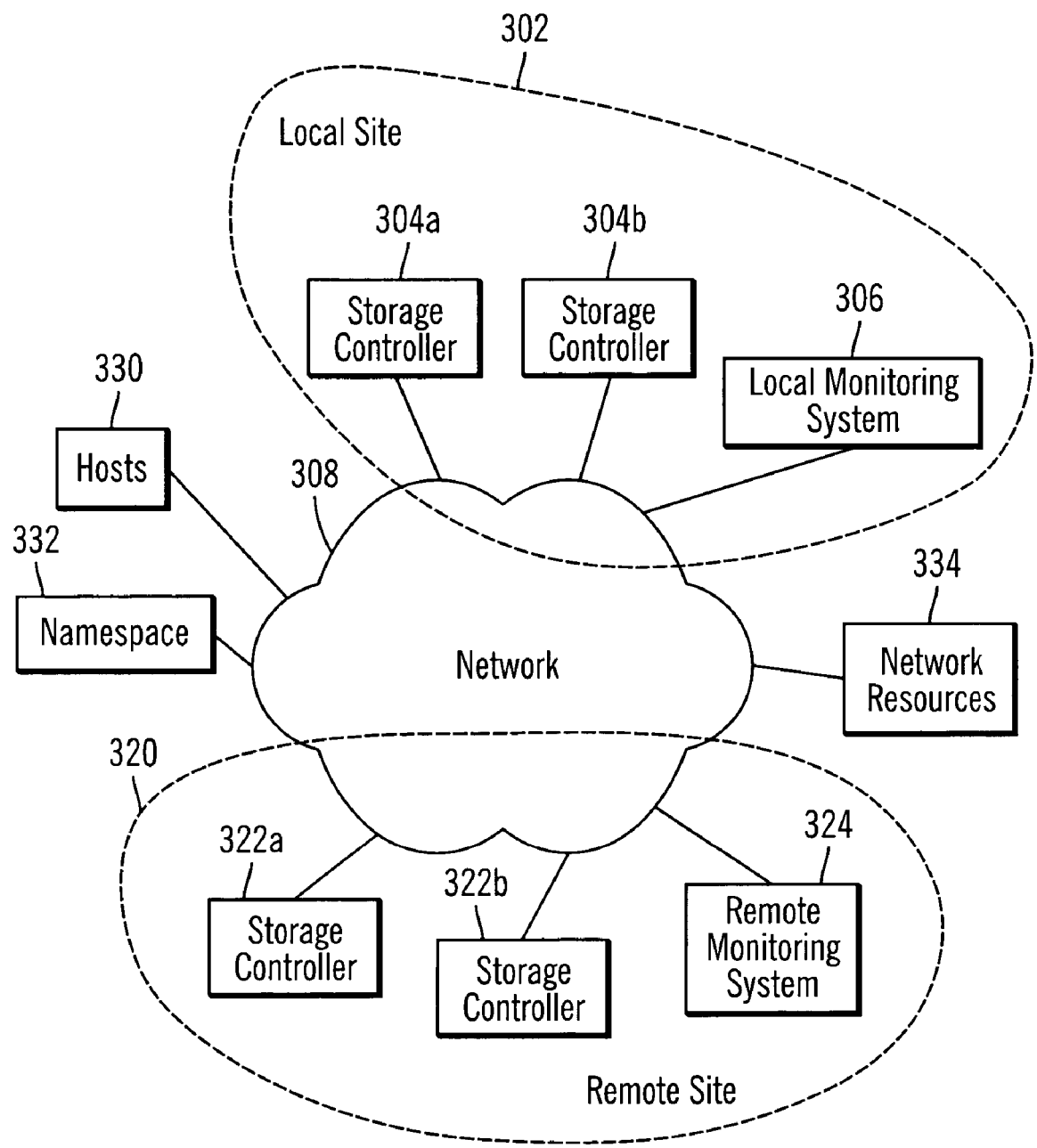
FIG. 6 illustrates a network computing environment in which further aspects of the invention are implemented.

FIG. 6 illustrates a further network computing environment where a local site 302 has local storage controllers 304a, 304b and a local monitoring system 306 that are connected to a network 308 and a remote site 320 having remote storage controllers 322a, 322b and remote monitoring system 324 also connected to the network 308. The local 302 and remote 320 sites may be situated as described with respect to the sites 2 and 20 of FIG. 1. Further, storage controllers 304a, 304b, 322a, 322b may comprise the storage controllers 4a, 4b, 22a, 22b described with respect to FIG. 1 having storage management software and storage systems attached thereto (not shown). The local monitoring system may include the components 34 and 36 described with respect to monitoring system 32 (FIG. 1). Further, hosts 330, a namespace 332 used to resolve requests directed to network addresses, and network resources 334, such as switches, etc., are coupled to the network 308. The network may comprise any network topology known in the art, such as a single network interconnecting all devices, such as a Wide Area Network (WAN), the Internet, and Intranet, etc. Further, the network 308 may comprise a network that is out-of-band with respect to the network paths 10, 28, and 30 used to transfer data between the storage controllers 4a, 4b, 22a, 22b (FIG. 1). For instance, the network paths 10, 28, and 30 may comprise dedicated fibre optical lines and the network 308 may comprise an Intranet, the Internet, virtual private network, etc. Alternatively, path 28 connecting the local 2 and remote 20 sites may be part of the network 308.

Figure 7:
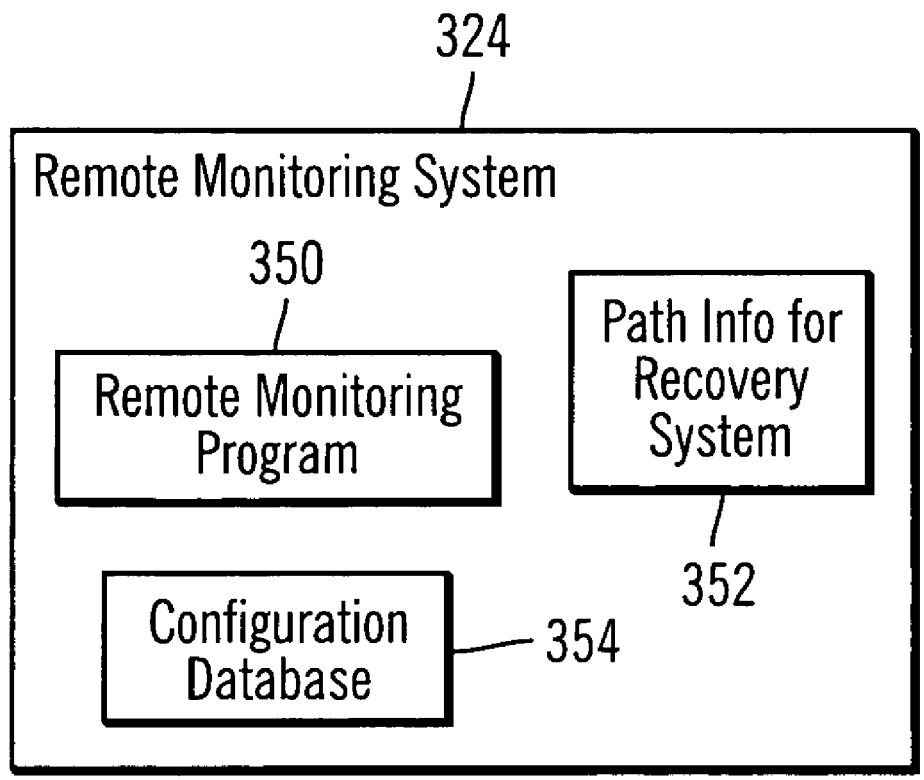
FIG. 7 illustrates components and information included in a in a remote monitoring system in accordance with implementations of the invention.

FIG. 7 illustrates components and information included in the remote monitoring system 324, including a remote monitoring program 350, path information for the recovery device 352 and a configuration database 354 including information on the network resources to reconfigure in the event of a failover to the remote site 320. The path information 352 may initially be set to the remote primary storage system 26a, but after the copy to the remote secondary storage system 26b completes (at blocks 212 and 24 in FIG. 5), the path information may be set to the remote secondary storage system 26b to use in the event of a failover from the local site 302. The path information 352 may indicate one or more network addresses of the remote storage subsystem mirroring data from the local site 302, which may include the same volume names and identifiers used in the storage subsystems 8a, 8b (FIG. 1) at the local site 302. The configuration database 354 includes entries for each resource to update, where the resource may comprise a program or device.

Figure 8:
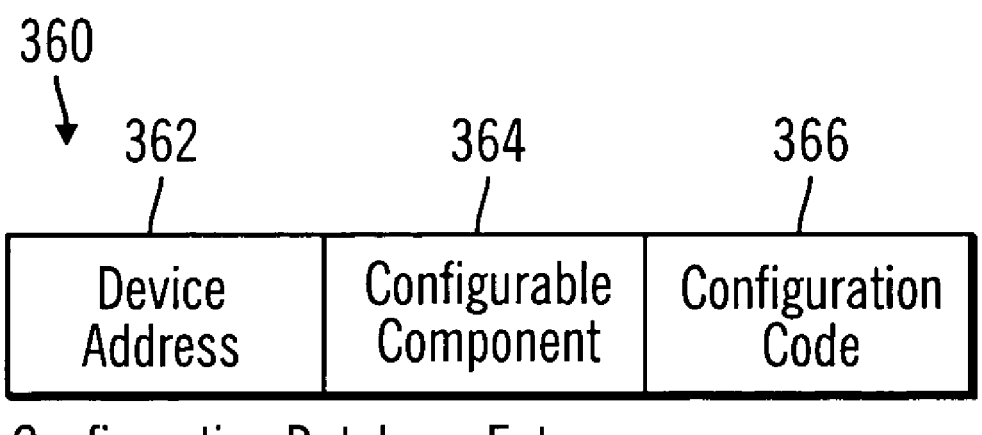
FIG. 8 illustrates a configuration database information providing information on resources to reconfigure in the event of a remote failover in accordance with implementations of the invention.

FIG. 8 illustrates information included in each configuration database entry 360, including:
  device address 362: indicating an address of the device in the network 308 including the resource to reconfigure.
  configurable component 364: identifies a component at the device address 362 that is being updated, such as an application program, database program, configuration setting in the operating system, e.g., registry file, or device information.
  configuration code 366: code, such as a script program, that when executed will update the configurable component 364 with the path information for the recovery system 352, so that the application or resource will direct requests to the storage systems 26a, 26b at the remote site 20 as opposed to one storage system 8a, 8b at the local site, which has experienced failure.

Figure 9:
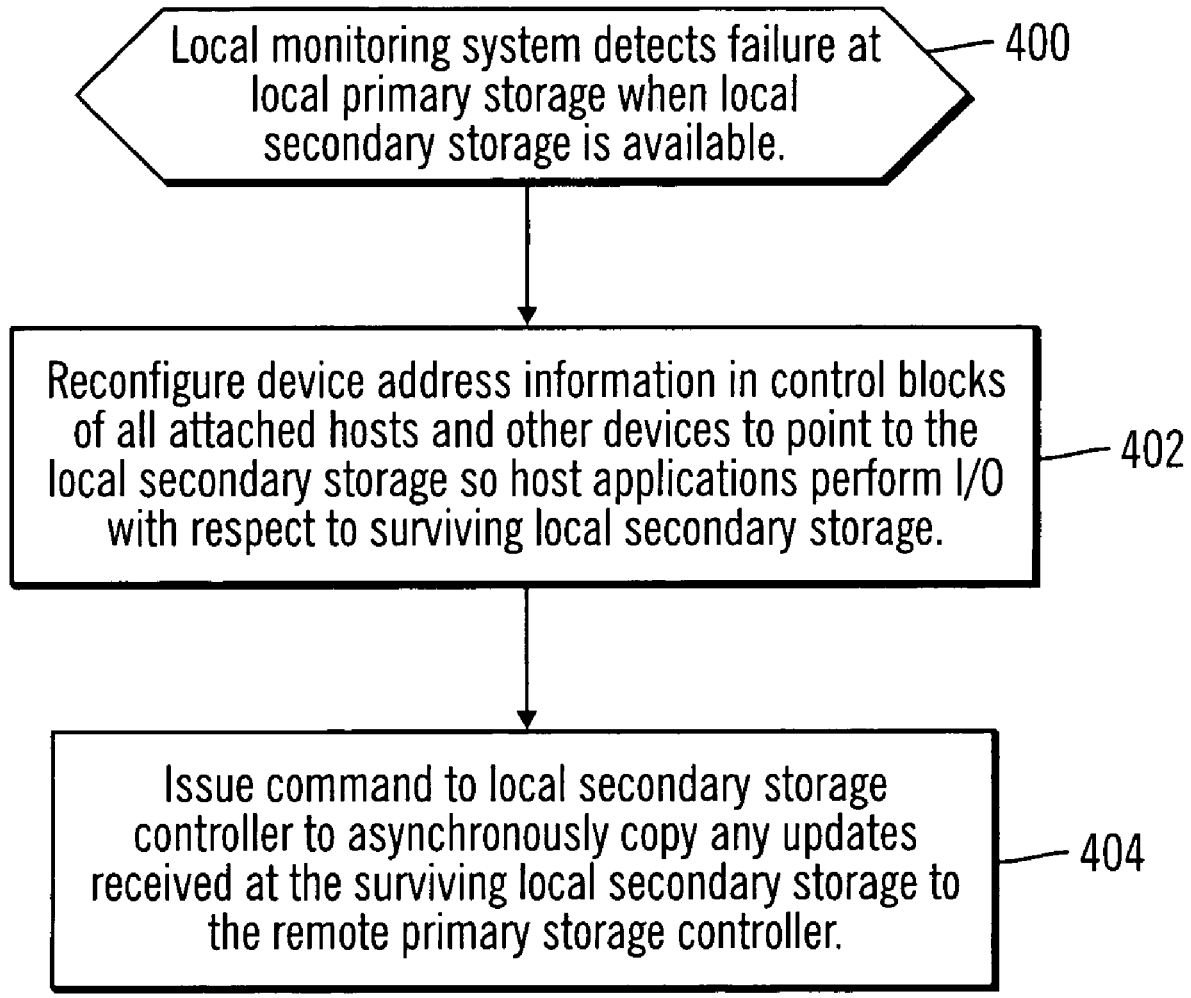
FIGS. 9 and 10 illustrate operations performed to handle a failover in accordance with implementations of the invention.

FIG. 9 illustrates operations performed by the monitoring program 34 in the local monitoring system 306 upon detecting (at block 400) a failure at the local primary storage controller 304a. In response, the local monitoring program 306 (or 32 in FIG. 1) reconfigures (at block 402) device address information in control blocks of all attached hosts 330 (FIG. 6) and other network resources 334 to point to the local secondary storage so host applications perform I/O with respect to the available local secondary storage 304b. The local monitoring system 306 may utilize the IBM Hyperswap™ feature to switch primary storage subsystems with the secondary storage subsystems without having to quiesce host applications. (Hyperswap is a trademark of International Business Machines Corp.) Further details of this operation are described in the copending and commonly assigned patent applications entitled "System and Method for Concurrent Logical Device Swapping", having application Ser. No. 10/134,254 and filed on Apr. 29, 2002 and "System and Method for Automatic Dynamic Address Switching", having application Ser. No. 10/134,414 and filed on Apr. 29, 2003, which patent applications are incorporated herein by reference in their entirety. After this switching, host 330 applications and other network resources 334 may perform I/O with respect to the surviving local secondary storage controller 304b.

The local monitoring system 306 would further issue (at block 404) a command to the local secondary storage controller 304b to asynchronously copy any updates received at the surviving local secondary storage to the remote primary storage controller 322a. Thus, after failing over to the local secondary storage controller 304b with only a very brief interruption to host I/O, updates received at the local secondary storage controller 304b in this failover mode are asynchronously copied to the remote primary storage controller 322a to maintain the remote primary storage controller 322a current and available for use in disaster recovery if the local secondary storage controller 304b subsequently fails while operating in failover mode. This ensures continuous operations at the local site 302 by using a failover process at the local site 302, such as the IBM Hyperswap, that provides minimal downtime while data concurrency and disaster recovery are maintained at the remote site 320. The failover to the local secondary storage system 8b (FIG. 1) may occur unplanned due to an unexpected failure at the primary storage system 8a or planned if there is maintenance done at the primary storage system 8a. In either case, the local monitoring system 306 will automatically implement the failover to the local secondary storage system 8b.

Figure 10:
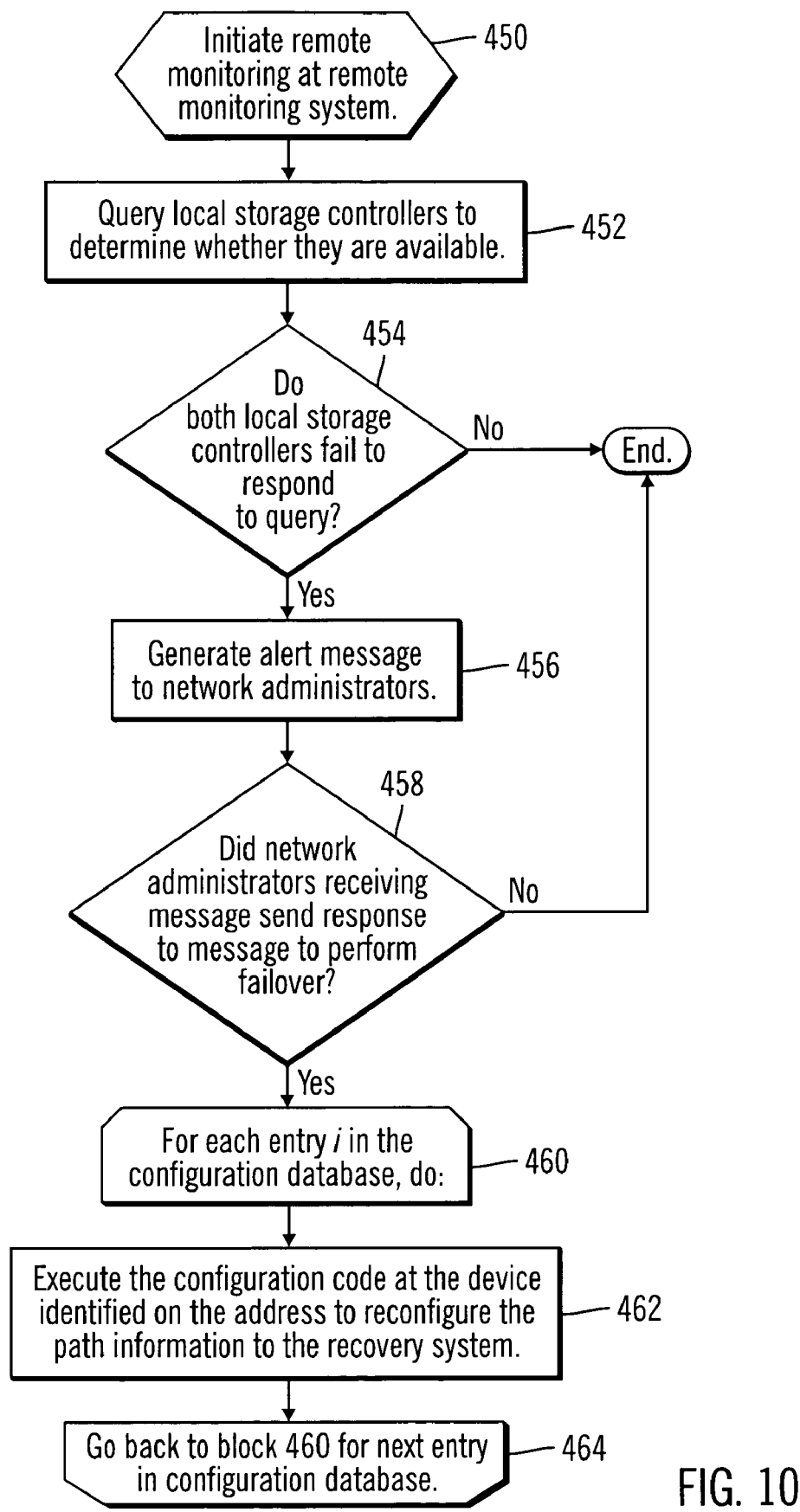

FIG. 10 illustrates operations performed by the remote monitoring program 350 to handle a failure of the entire local site 302 requiring a failover to the remote site 320, which may be in a geographically remote location, such as thousands of miles away. At block 450, the remote monitoring program 350 initiates monitoring of the storage controllers 304a, 304b at the local site 302 over the network 308. The remote monitoring program 350 will then query (at block 452) local storage controllers 304a, 304b to determine whether they are available. If (at block 454) at least one is available, then control ends because any failover can be handled by the local monitoring system 324, which means that the entire local site 304a has not experienced a catastrophic event. If both storage controllers 304a, 304b are unavailable, then the remote monitoring program 350 generates an alert messages to one or more designated remote network administrators notifying them of the outage and requesting guidance. In certain implementations, the remote monitoring system 324 defers to a human determination of whether a remote failover should occur. The network administrator may determine that the reason for the failure of the local site 302 is temporary and not due to a catastrophic event at the local site 302 and that a remote failover is unnecessary. The remote network administrator may further determine that systems at the local site 302 will not be available for an extended time. In such case, the network administrator may return a response to the notification from the remote monitoring system 324 indicating to perform a remote failover or do nothing. For instance, if the remote monitoring system 324 sent an email with a check box indicating the network administrator's choice, then the network administrator may respond with indication of one choice in a reply email. Any other notification and response mechanism known in the art may be used. For instance, in response to receiving electronic automated notification via pager, phone, etc., the network administrator may access the remote monitoring system 324 from a remote location over the network 308 and indicate whether or not to perform the remote failover.

If (at block 458) the network administrator did not indicate to perform a remote failover, then control ends. Otherwise, if the remote failover option was selected, then a loop is performed at blocks 460 through 464 for each entry 360 in the configuration database 354. For entry i, the remote monitoring program 350 would execute (at block 362) the configuration code 366 in entry i at the device identified at the device address 362 to reconfigure information indicating the device address for the volumes to the device address indicated in the path information 352. The reconfiguration may be performed by updating files used by an application program, such as a database program as well as operating system files providing information on attached devices, such as a registry file. Further, one configuration database entry 360 may update a network namespace 362 that is used to resolve network addresses to resolve an address directed to the primary storage system 8a to one remote storage system 26a, 26b identified in the path information 352.

In the logic of FIG. 10, host access to storage is only denied until the remote monitoring system reconfigures that particular host to use the remote storage. Further, the data available at the remote storage systems 26a, 26b is consistent as of a point of time that may not include the most recent updates to the primary storage system 8a made before the failure occurred. In such case, all the applications and other network resources would have to reinitialize as of the consistency time at the remote storage system.

The failure that triggers the remote failover of FIG. 9 may occur after the operations of FIG. 8 were performed to use the local secondary storage system 8b due to a failure at the local primary storage system 8a.

In additional implementations, the remote monitoring program 350 may transmit a command to every host 330 and network resource 334 in the network 308 to cause the reconfiguration of resources at the hosts 330 and network resources 334 to identify the remote storage system as the I/O device for any subsequent I/O requests directed to the local primary storage system 8a, where each host 330 and network resource 334 would include code to process and locally execute the command from the remote monitoring program 350 to reconfigure resources to use the remote storage.

Described implementations provide techniques to maintain continuous availability while data is mirrored to a local secondary storage 8b and to remote secondary storage systems 8a, 8b. Further, described implementations provide techniques for handling a failover to either the local secondary storage 8b or a remote secondary storage 26a, 26b in a manner that minimizes disruptions to host I/O requests. Still further, if the failover occurs at the local site, then updates are still mirrored to the remote site to maintain the remote site concurrent for data recovery purposes.

Additional Implementation Details

The described techniques for mirroring data and handling failovers between different storage locations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory, devices (e.g., EEPROMs, ROMs, PROMs, RAMs. DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations were described with respect to the IBM PPRC Extended Distance computing environment. However, the described implementations for maintaining consistency could be applied to maintain consistency in other computing and vendor environments and using other data copying protocols and programs than described herein.

In certain implementations, data in the storage devices is arranged in volumes. In alternative systems, the storage areas on which data is maintained may be grouped according to storage units other than volumes that are grouped in groupings other than sessions for the purpose of maintaining consistency.

In described implementations, data updates were organized in consistency groups before being transferred from one storage controller to another. In alternative implementations, the data copied between the different storage controllers may not comprise a consistency group.

The logic performed by the monitoring program 34 was described as implemented in a monitoring system 32 separate from the storage controllers 4a, 4b, 22a, 22b used for the data mirroring. In alternative implementations, the monitoring program 34 operations described above may be performed by the storage management software 6a, 6b, 24a, 24b within one of the storage controllers 4a, 4b, 22a, 22b. The monitoring system 32 may be located within the local site 38 or external thereto. Further, the remote monitoring system 32 may be located at the remote site 320 or external thereto.

The described implementations for establishing a logical point-in-time copy relationship were described for use with systems deployed in a critical data environment where high availability is paramount. However, those skilled in the art will appreciate that the point-in-time copy operations described herein may apply to storage systems used for non-critical data where high availability is not absolutely necessary.

In the described implementations, the remote monitoring system 324 waits for a network administrator to approve a remote failover before reconfiguring the network resources. In alternative implementations, the remote monitoring system 324 may automatically perform the reconfiguration operation when detecting unavailability of the local storage controllers or perform further tests and diagnostics to determine whether to perform the reconfiguration operation.

The illustrated logic of FIGS. 3-5 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 11:
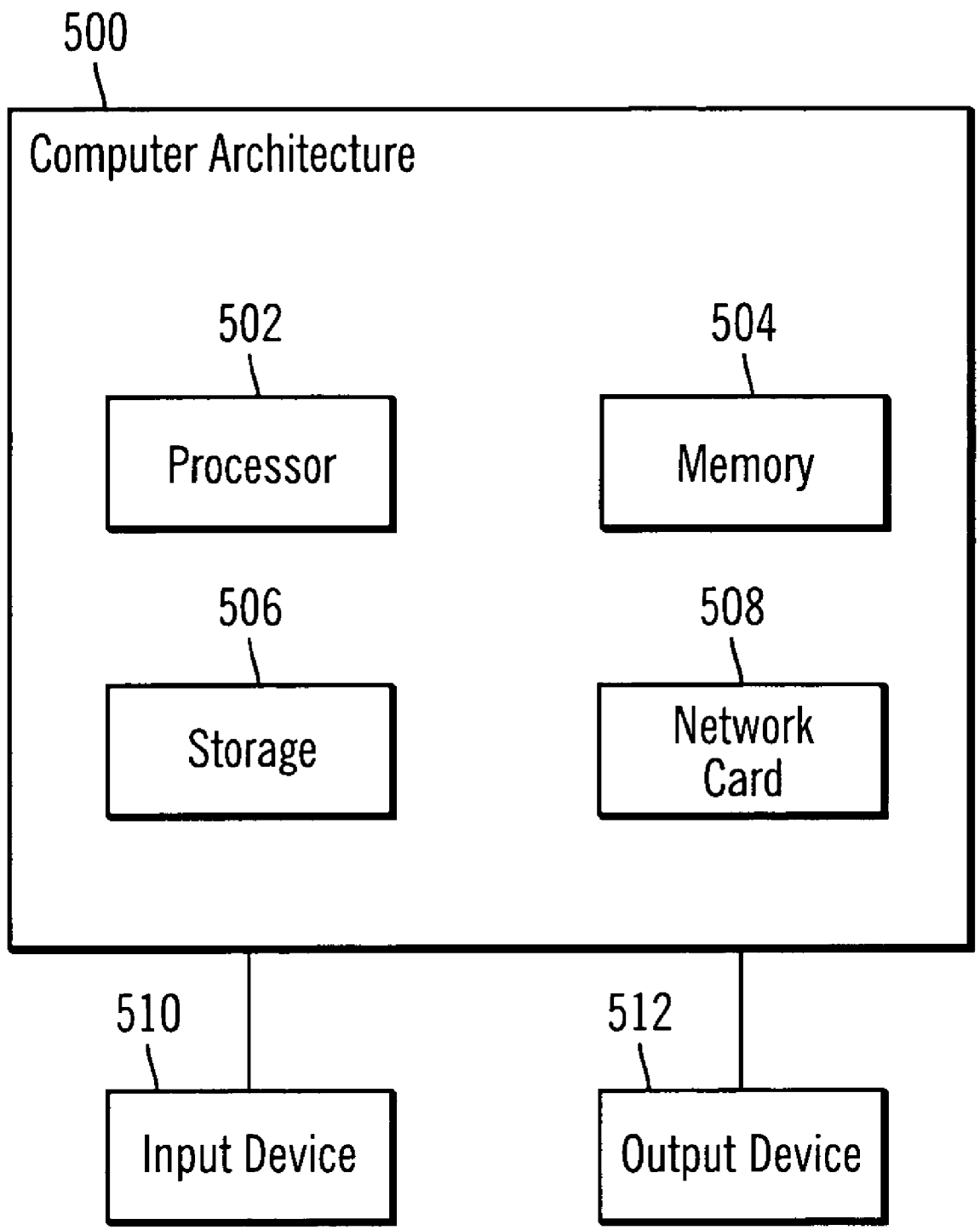
FIG. 11 illustrates an architecture of computing components in the network environment, such as the storage controllers, monitoring system, hosts, network resources, etc.

FIG. 11 illustrates one implementation of a computer architecture 500 of the network components, such as the monitoring system and storage controllers shown in FIG. 1. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.).

The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mirroring data, comprising:
   processing a mirror policy indicating volumes in a first storage system to mirror to volumes in a second storage system and volumes in the second storage system to mirror to volumes in a third storage system, wherein the third storage system is at a first geographical location remote with respect to a second geographical location including the first and second storage systems, and wherein the mirror policy indicates volumes in the third storage system to mirror to volumes in a fourth storage system at the second geographical location;
   performing an initial copy operation to copy volumes in the mirror policy from the first storage system to the second storage system and to copy the volumes in the mirror policy to a third storage system;
   transmitting a command to cause the copying of updates to the volumes in the first storage system to corresponding volumes in the second storage system indicated in the mirror policy in response to completing the copying of the volumes in the mirror policy to the second storage system;
   upon an occurrence of an event, causing the suspension of the copying of updates to the volumes in the first storage system indicated in the mirroring policy to the volumes in the second storage system to form a consistency group of updates between volumes in the second and third storage systems that is consistent as of a point in time with the volumes in the first storage subsystem; and
   during the suspension of the copying of volumes between the first and second storage systems, causing the copying of updates to the volumes in the second storage system indicated in the mirroring policy, which comprise the updates to the volumes in the first storage system, from the second storage system to the volumes in the third storage system indicated in the mirroring policy to form the consistency group of updates among volumes in the first, second and third storage systems as of the point-in-time;
   determining whether the copying of the updates to the volumes in the first storage system from the second storage system to volumes in the third storage system has completed;
   causing the end of the suspension to cause the continuation of the copying of updates to the volumes in the first storage system to the volumes in the second storage system in response to completing the copying of the updates to the volumes in the first storage system from the second storage system to the third storage system;
   determining whether the copying of the updates to the volumes in the second storage system to volumes in the third storage system has complete; and
   making a copy of the volumes in the third storage system indicated in the mirroring policy to the volumes in the fourth storage system indicated in the mirroring policy to harden the consistency group in the fourth storage system, where a consistency group of data as of a point-in-time is maintained in the volumes in the first, second, third, and fourth storage subsystems.

2. The method of claim 1, wherein the command to cause the copying of updates to volumes in the first storage system to volumes in the second storage system causes asynchronous copying.

3. The method of claim 1, wherein the command to cause the copying of updates to volumes in the second storage system to volumes in the third storage system causes asynchronous copying.

4. The method of claim 1, wherein determining whether the copying of the updates to the volumes in the second storage system to volumes in the third storage system has completed comprises:
   causing the sending of a query command to a storage controller managing access to the third storage system to determine whether all updates to volumes in the second storage system have been received to volumes in the third storage system.

5. The method of claim 4, further comprising:
   periodically causing the sending of the query command to determine whether all updates to volumes in the second storage system have been received to volumes in the third storage system.

6. The method of claim 1, wherein making the copy of the volumes between the third and fourth storage system comprises making a logical copy of pointers to the volumes in the third storage system and copying the data addressed by the pointers in the volumes in the third storage system to the volumes in the fourth storage system.

7. The method of claim 1, wherein updates continue to be received and made to the volumes in the first storage system during the suspension of the copying of volumes between the first and second storage systems.

8. The method of claim 1, wherein the first and second geographical locations are separated by at least two hundred miles.

9. The method of claim 1, wherein the operation of copying updates to the volumes in the first storage system to the corresponding volumes in the second storage system indicated in the mirror policy is continuous, except during a time of the suspension of the copying of the volumes between the first and second storage systems to form a consistency group.

* * * * *